(12) United States Patent
Kawamura

(10) Patent No.: US 9,585,019 B2
(45) Date of Patent: Feb. 28, 2017

(54) DEVICE MANAGEMENT APPARATUS AND DEVICE MANAGEMENT METHOD

(71) Applicant: OMRON Corporation, Kyoto-shi, Kyoto (JP)

(72) Inventor: Atsushi Kawamura, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 14/423,223

(22) PCT Filed: Jul. 31, 2013

(86) PCT No.: PCT/JP2013/070716
§ 371 (c)(1),
(2) Date: Feb. 23, 2015

(87) PCT Pub. No.: WO2014/030510
PCT Pub. Date: Feb. 27, 2014

(65) Prior Publication Data
US 2015/0245212 A1  Aug. 27, 2015

(30) Foreign Application Priority Data

Aug. 22, 2012  (JP) ................................ 2012-183376

(51) Int. Cl.
*H04M 1/66* (2006.01)
*H04M 1/68* (2006.01)
(Continued)

(52) U.S. Cl.
CPC ............ *H04W 12/08* (2013.01); *G06Q 30/06* (2013.01); *G06Q 50/18* (2013.01);
(Continued)

(58) Field of Classification Search
CPC ..................................................... H04L 67/12
(Continued)

(56) References Cited

U.S. PATENT DOCUMENTS

2002/0010756 A1 * 1/2002 Oku ........................ H04L 29/06
709/217
2002/0059431 A1 * 5/2002 Terada ................... G06Q 30/06
709/227

(Continued)

FOREIGN PATENT DOCUMENTS

JP  2004-180190 A  6/2004
JP  2005-260914 A  9/2005

(Continued)

OTHER PUBLICATIONS

International Search Report issued in PCT/JP2013/070716 mailed on Aug. 27, 2013 (2 pages).

(Continued)

*Primary Examiner* — Sam K Ahn
*Assistant Examiner* — Fabricio R Murillo Garcia
(74) *Attorney, Agent, or Firm* — Osha Liang LLP

(57) ABSTRACT

A device management apparatus that mediates between an owner of a device and a user who is not the owner of the device in order to permit the user to use the device, includes a device information storage section in which information on each of a plurality of devices is registered, an acquisition section which acquires a desired condition from a user, and a matching process section which performs matching between the desired condition acquired from the user and the information on each device registered in the device information storage section thereby selecting a device satisfying the desired condition as a target device, generating contract information related to the use of the target device between an owner of the target device and the user, and granting a control right of the target device to the user.

12 Claims, 7 Drawing Sheets

(51) Int. Cl.
*H04M 3/16* (2006.01)
*H04W 12/08* (2009.01)
*G06Q 30/06* (2012.01)
*G06Q 50/18* (2012.01)
*H04M 1/725* (2006.01)
*H04M 1/67* (2006.01)
*H04L 29/08* (2006.01)

(52) U.S. Cl.
CPC ......... *H04L 67/2809* (2013.01); *H04L 67/12* (2013.01); *H04M 1/67* (2013.01); *H04M 1/72533* (2013.01)

(58) Field of Classification Search
USPC .......................................................... 455/410
See application file for complete search history.

(56) References Cited

U.S. PATENT DOCUMENTS

| | | | | |
|---|---|---|---|---|
| 2002/0111822 | A1 | 8/2002 | Shimizu et al. | |
| 2004/0010693 | A1* | 1/2004 | Noguchi | G06F 21/10 713/176 |
| 2005/0144343 | A1* | 6/2005 | Hamdan | H04L 69/329 710/57 |
| 2005/0154598 | A1* | 7/2005 | Kanayama | G06Q 20/102 705/400 |
| 2007/0177020 | A1* | 8/2007 | Tanaka | H04N 1/0018 348/207.99 |
| 2007/0262863 | A1 | 11/2007 | Aritsuka et al. | |
| 2008/0164997 | A1 | 7/2008 | Aritsuka et al. | |
| 2008/0282296 | A1* | 11/2008 | Kawai | H04N 5/232 725/62 |
| 2009/0204370 | A1* | 8/2009 | Chu | G06F 9/4411 702/188 |

FOREIGN PATENT DOCUMENTS

| | | |
|---|---|---|
| JP | 2005-321934 A | 11/2005 |
| JP | 2006-031723 A | 2/2006 |
| JP | 2007-094834 A | 4/2007 |
| JP | 2007-300571 A | 11/2007 |
| JP | 2007-300572 A | 11/2007 |
| JP | 2009-145989 A | 7/2009 |
| JP | 2009-187554 A | 8/2009 |
| JP | 2009-541861 A | 11/2009 |
| WO | 2007/149848 A2 | 12/2007 |

OTHER PUBLICATIONS

International Preliminary Report on Patentability from PCT/JP2013/070716 issued on Oct. 20, 2014 (4 pages).

Kanamaru, T. et al.; "A Virtual Network Organization and Resource Management Mechanism in Sensor and Actuator Networks"; IPSJ SIG Techinical Reports, vol. 2008, No. 116, Nov. 27-28, 2008, pp. 67-74 (10 pages).

Office Action issued in corresponding Japanese Application No. 2014-531565, mailed on Sep. 13, 2016 (9 pages).

\* cited by examiner

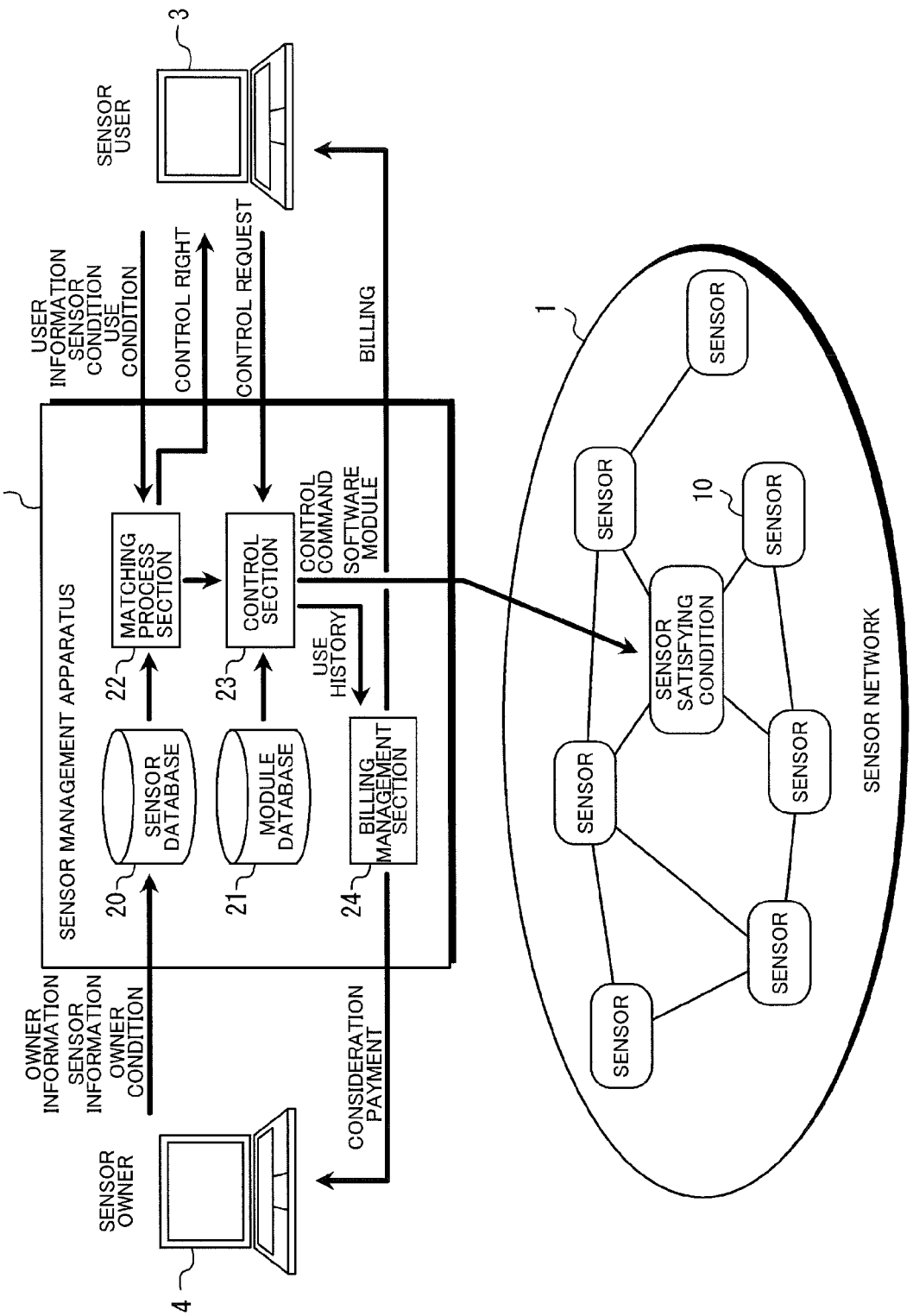

FIG. 2 (a) OWNER INFORMATION TABLE

| OWNER ID | OWNED SENSOR ID | OWNER CONDITION ID | ACCOUNT NUMBER |
|---|---|---|---|
| .... | .... | OWNER CONDITION 1 | .... |
| .... | .... | OWNER CONDITION 2 | .... |
| .... | .... | .... | .... |

FIG. 2 (b) OWNER CONDITION TABLE

| OWNER CONDITION ID | USER LEVEL | CONTROLLABLE TIME | CONTROL RANGE | ... | DEGREE OF PRIORITY | CONSIDERATION | |
|---|---|---|---|---|---|---|---|
| OWNER CONDITION 1 | ACADEMIC | 10:00~17:00 | RESOLUTION ONLY | .. | HIGH | FIXED RATE | ○YEN/YEAR |
| OWNER CONDITION 2 | ACADEMIC | 17:00~24:00 | All | .. | HIGH | METERED RATE | ○YEN/MINUTE |
| OWNER CONDITION 3 | BUSINESS OPERATOR | .... | .... | .. | MIDDLE | FIXED RATE | ○YEN/YEAR |
| OWNER CONDITION 4 | GENERAL USER | .... | .... | .. | LOW | METERED RATE | ○YEN/MINUTE |
| .... | .... | .... | .... | . | .... | .... | .... |

FIG. 2 (c) SENSOR INFORMATION TABLE

| OWNED SENSOR ID | SENSOR TYPE | INSTALLATION POSITION | SPECIFICATIONS | USABLE MODULE |
|---|---|---|---|---|
| .... | CAMERA | LATITUDE: xxxxxx LONGITUDE: yyyyyy | .... | .... |
| .... | TEMPERATURE SENSOR | .... | .... | .... |
| .... | HUMIDITY SENSOR | .... | .... | .... |
| .... | .... | .... | .... | .... |

FIG. 3 MODULE DATABASE

| MODULE ID | APPLICABLE SENSOR ID | TYPE |
|---|---|---|
| ... | ... | FACIAL RECOGNITION |
| ... | ... | OBJECT DETECTION |
| ... | ... | LICENSE PLATE NUMBER RECOGNITION |
| ... | ... | ... |

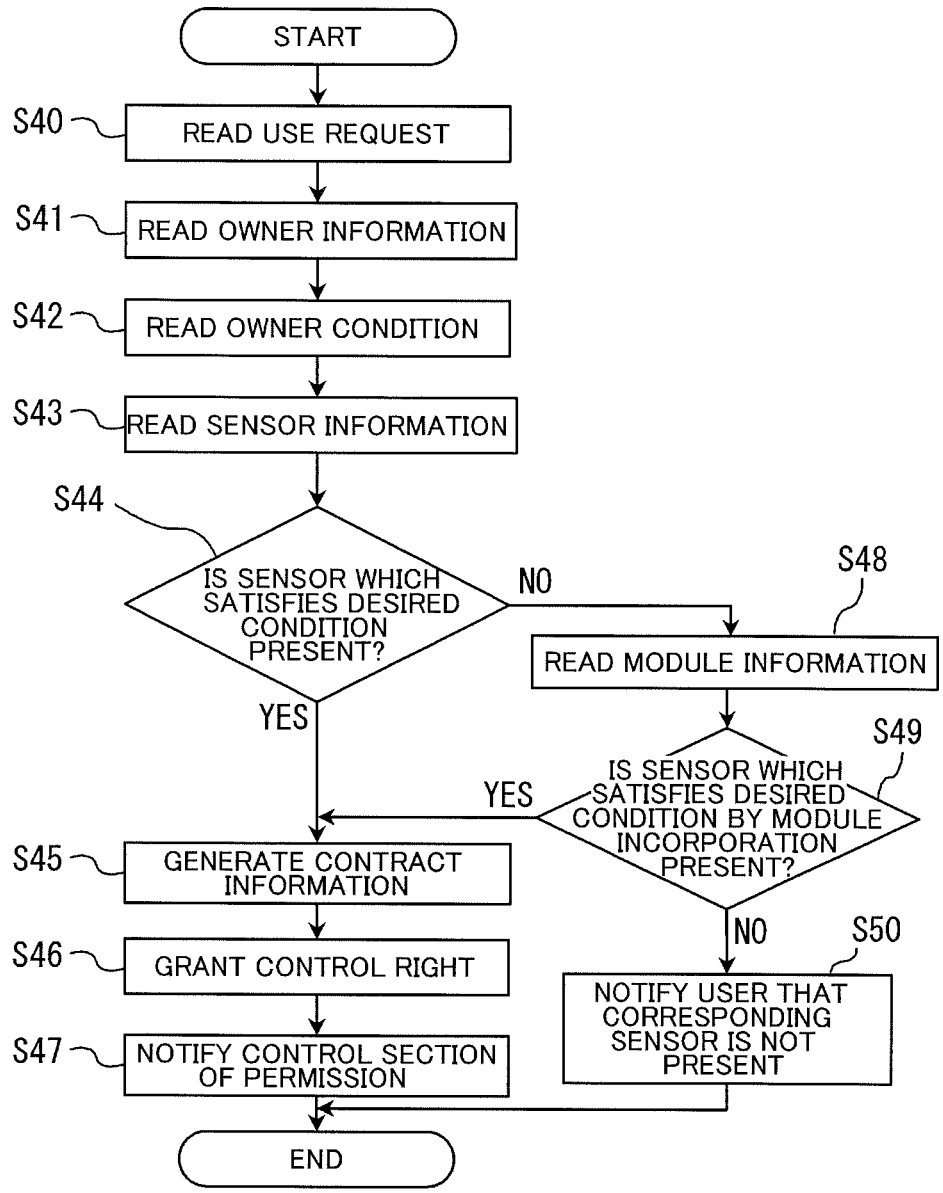

FIG. 5 (a) USER INFORMATION TABLE

| USER ID | SENSOR CONDITION ID | USE CONDITION ID | ACCOUNT NUMBER |
|---|---|---|---|
| ..... | SENSOR CONDITION ID 1 | USE CONDITION 1 | ..... |
| ..... | SENSOR CONDITION ID 2 | USE CONDITION 2 | ..... |
| ..... | ..... | ..... | ..... |

FIG. 5 (b) USE CONDITION TABLE

| USE CONDITION ID | USER LEVEL | USE REQUEST TIME | CONTROL REQUEST RANGE | PAYMENT AMOUNT | | USE METHOD |
|---|---|---|---|---|---|---|
| USE CONDITION 1 | ACADEMIC | 12:00~13:00 | CONTROL OF ANGLE OF VIEW | FIXED RATE | △YEN/ YEAR | CONTINUOUS USE |
| USE CONDITION 2 | ACADEMIC | 9:00~10:00 | ..... | METERED RATE | △YEN/ MINUTE | CONTINUOUS USE |
| USE CONDITION 3 | BUSINESS OPERATOR | ..... | ..... | ..... | | TEMPORARY USE |
| USE CONDITION 4 | GENERAL USER | ..... | ..... | ..... | | ..... |

FIG. 5 (c) SENSOR CONDITION TABLE

| SENSOR CONDITION ID | SENSOR TYPE | INSTALLATION POSITION | SPECIFICATIONS |
|---|---|---|---|
| ..... | CAMERA | LATITUDE:xxxxxx LONGITUDE:yyyyyy | ..... |
| ..... | TEMPERATURE SENSOR | ..... | ..... |
| ..... | HUMIDITY SENSOR | ..... | ..... |
| ..... | ..... | ..... | ..... |

FIG. 6 (a) CONTRACT INFORMATION TABLE

| CONTRACT ID | OWNER ID | USER ID | TARGET SENSOR ID | MODULE ID | CONTRACT CONDITION ID |
|---|---|---|---|---|---|
| CONTRACT 1 | ..... | ..... | ..... | ..... | CONTRACT CONDITION 1 |
| ..... | | | | | ..... |

FIG. 6 (b) CONTRACT CONDITION TABLE

| CONTRACT CONDITION ID | USER LEVEL | USE TIME | CONTROL RANGE | PAYMENT AMOUNT | USE METHOD |
|---|---|---|---|---|---|
| CONTRACT CONDITION 1 | ACADEMIC | 12:00~13:00 | CONTROL OF ANGLE OF VIEW | FIXED RATE △YEN/YEAR | CONTINUOUS USE |
| CONTRACT CONDITION 2 | BUSINESS OPERATOR | 9:00~10:00 | ..... | METERED RATE △YEN/MINUTE | TEMPORARY USE |
| ..... | ..... | ..... | ..... | ..... | ..... |

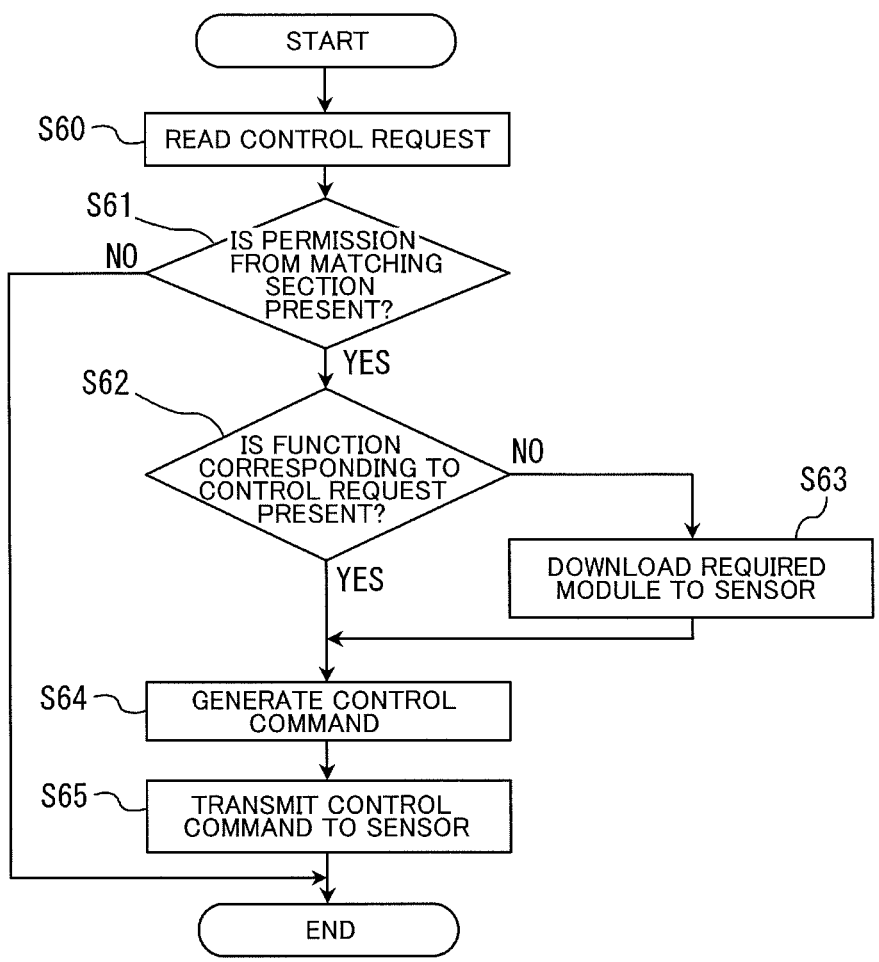

DEVICE MANAGEMENT APPARATUS AND DEVICE MANAGEMENT METHOD

BACKGROUND

Technical Field

The present invention relates to a technology for mediating between an owner of a device and a user of a device.

Related Art

As a means for realizing a ubiquitous society, a sensor network is in the spotlight. The sensor network is a technology which disposes sensor devices each having a detection function and a communication function at various places and networks the sensor devices, thereby implementing the collection, management, and seamless use of sensing data (see Patent Literatures 1 to 3). When the sensor network is realized, it becomes easy to quickly grasp a situation at any place from anywhere, and hence it is considered that wide application of the sensor network is promising in not only industrial fields, more specifically, in the frontlines of production and distribution, but also in fields related to social systems such as transportation and various infrastructures and living such as medical treatment and education. For example, Patent Literature 1 discloses a method which prevents unfair use of a sensor by performing access right control for each medical staff in a body sensor network (BSN) used in the medical field.

CITATION LIST

Patent Literature

PTL 1: Japanese Translation of PCT Application No. 2009-541861
PTL 2: Japanese Patent Application Laid-open No. 2007-300571
PTL 3: Japanese Patent Application Laid-open No. 2007-300572

SUMMARY OF INVENTION

Various types of sensors are already installed at all places in the world. Examples of the sensor include a monitoring camera set for finding a suspicious person and for crime prevention, a roadside camera installed for measuring a traffic volume and detecting a traffic congestion, and a temperature sensor installed for monitoring a change in temperature and an environment in a factory. These sensors are provided in order to collect data for achieving a purpose of an owner (or an administrator) of the sensor in general, and, inmost cases, they are not used (the sensor itself is not operated, or sensing data is not used even when the sensor is operated) except when data collection is performed. This situation is extremely wasteful from the viewpoint of effective use of resources.

To cope with this, the present inventors intend to construct a sensor network having a system in which the owner of the sensor obtains a consideration from a user by permitting the user who wishes to use the sensor to temporarily use the sensor or providing sensing data to the user. When such a system is realized, the system is beneficial to the owner and the user because the owner of the sensor can make a profit by utilizing idle time of the sensor, and the user can obtain required data at low cost since an investment for the installation of the sensor is not necessary.

However, when the number of sensors registered in the sensor network (i.e., the number of choices of the sensor) becomes extremely large, it becomes difficult to find the sensor optimum for the achievement of the purpose of the user so that convenience for the user may be reduced. Furthermore, for example, in the case where it is necessary to change the setting of the sensor from its default setting (setting made by the owner of the sensor) in order to obtain data desired by the user, how to enhance convenience in sensor use is a question to be answered.

Although the description has been given thus far by using the sensor as the example, the network of a device such as an actuator (or a controller) may have similar issues. The "sensor" and the "actuator" are different from each other in that the sensor "detects (acquires) a state" and the actuator "changes a state", but the "sensor" and the "actuator" are similar to each other in that each of the "sensor" and the "actuator" has a cause-and-effect relationship with a target area in a predetermined region. Accordingly, in the present description, the sensor and the actuator are collectively referred to as a "device", and the network configured by the device is referred to as a "device network". The sensor and the actuator may coexist in the device network.

One or more embodiments of the present invention provides a technology for facilitating the use and control of the device by a person who is not the owner of the device and promoting the use of the device on the device network.

A device management apparatus according to one or more embodiments of the present invention mediates between the device owner and the user to execute selection of the device satisfying a desired condition from the user and granting of a control right of the device to the user, and the like. The device serving as the management target in one or more embodiments of the present invention is a device having the cause-and-effect relationship with the target area in the predetermined region. The sensor and the actuator (including a mode which includes a controller which receives information from the sensor and controls the operation of the actuator) correspond to such a device. In addition, a device which can operate as the sensor and the actuator (example: bidirectional conversion of mechanical vibration and electric vibration by a piezoelectric element) also corresponds to such a device. The sensor is a device which detects (acquire) a state of the target area. In the case of the sensor, there is a cause-and-effect relationship between the state of the target area ("cause") and information detected (acquired) by the sensor ("effect"). The actuator is a device which changes the state of the target area. In the case of the actuator, there is a cause-and-effect relationship between the action and operation of the actuator ("cause") and the state change of the target area ("effect").

Specifically, one or more embodiments of the present invention includes a device information storage section in which information on each of a plurality of devices is registered, an acquisition section which acquires a desired condition from a user, and a matching process section which performs matching between the desired condition acquired from the user and the information on each device registered in the device information storage section, thereby selecting a device satisfying the desired condition as a target device and granting a control right of the target device to the user. In addition, the device management apparatus according to one or more embodiments of the present invention further includes a control section which acquires a control request of the target device from the user, to whom the control right is granted, and transmits a control instruction corresponding to the control request to the target device.

According to this configuration, only by giving the desired condition to the device management apparatus by the user who desires to use the device, the device satisfying the desired condition is automatically selected. Therefore, labor required to find the desired device from among a large number of the devices is significantly reduced, and convenience is thereby improved. In addition, since the control right of the device is granted to the user, the user can control the device by oneself. At this point, since the control section of the device control apparatus performs mediation, the user does not need to think about hardware specifications of the device or specifications of the control instruction, or the like. Therefore, the use and control of the device by the user are extremely simplified, and it is possible to achieve an improvement in convenience.

The plurality of devices according to one or more embodiments of the present invention include a device capable of function extension by addition of a software module, and the matching process section selects a device, which has a function satisfying the desired condition, or a device, which does not have the function satisfying the desired condition but to which the software module having the function can be added, as the target device. With this, it is possible to increase the use opportunity of the device, and also improve the convenience for the user. In one or more embodiments of the present invention, in a case where a device which has a function satisfying the desired condition is not present among the plurality of devices, the matching process section selects a device, which does not have the function satisfying the desired condition but to which a software module having the function can be added, as the target device. With this, the device which requires small labor at the time of use of the device (incorporation of the software module and the like) is preferentially selected. In a case where the target device is a device, which does not have a function satisfying the desired condition but to which a software module having the function can be added, according to one or more embodiments of the present invention, the control section downloads the required software module to the target device when the control section transmits the control instruction to the target device. With this, since the required software module is incorporated at appropriate timing even when the user or the owner of the device does not think about anything, a further improvement in convenience is achieved.

The matching process section according to one or more embodiments of the present invention has a mediation section for determining which user is permitted to use a device in a case where there are a plurality of the users of the same device. The mediation section according to one or more embodiments of the present invention determines the user, to whom the control right is granted, based on a degree of priority pre-set for each user type, or a use charge presented by the user, or both of the degree of priority and the use charge.

The mediation section according to one or more embodiments of the present invention grants the control right of the same target device to a plurality of the users, and the control section permits the plurality of the users to use the target device in a time-sharing manner. With this, the owner of the device obtains an advantage that an improvement in the use efficiency of the device is achieved, and the user obtains an advantage that loss of the use opportunity due to competition with others is reduced and convenience is improved. In this case, according to one or more embodiments of the present invention, allocation time is determined for each user according to the degree of priority for each user type and the use charge presented by each user described above.

According to one or more embodiments of the present invention, the user can request continuous use of a device in desired use time and, in a case where the control right is granted to the user having requested the continuous use, the mediation section prohibits granting of the control right of the same device, for which use time overlaps, to the other users. With this, since the user can exclusively use the device for specific time, elimination of disturbance or delay and real-time processing and the like can be expected. This is preferable e.g., in the case where an important process is performed or the case where a large number of processes are executed continuously.

A device management apparatus according to one or more embodiments of the present invention may include any combination of the above structures, and can also include a device network system configured by the device management apparatus and a plurality of the devices. In addition, a device management method according to one or more embodiments of the present invention may include any combination of the above processes, and can also include a program for causing a computer to execute each step of the device management method or a storage medium non-transitorily recording the program.

According to one or more embodiments of the present invention, it is possible to facilitate the use and control of the device by a person who is not the owner of the device and promote the use of the device on the device network.

BRIEF DESCRIPTION OF DRAWINGS

FIG. 1 is a view showing the configuration of a sensor network system;

FIGS. 2(*a*) to 2(*c*) are views showing examples of information registered in a sensor database;

FIG. 3 is a view showing an example of information registered in a module database;

FIG. 4 is a flowchart showing the flow of a process of a matching process section;

FIGS. 5(*a*) to 5(*c*) are views showing examples of information inputted from a user of a sensor;

FIGS. 6(*a*) and 6(*b*) are views showing examples of contract information generated by the matching process section; and FIG. 7 is a flowchart showing the flow of a process of a control section 23.

DESCRIPTION OF EMBODIMENTS

Embodiments of the invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

<System Configuration>

With reference to FIG. 1, a description will be given of an example of the configuration of a sensor network system as an example of a device network system according to one or more embodiments of the present invention.

The sensor network system is configured by a sensor network 1 as a type of a device network, and a sensor management apparatus 2 as a device management apparatus. The sensor network 1 is a network configured by a large number of sensors 10 present at various places. The structure and communication system and the like of the network can be arbitrarily designed, and are not particularly limited. Each sensor 10 can communicate with the sensor management apparatus 2 via a wide area network such as, e.g., the Internet or the like. The sensor management apparatus 2 is a server apparatus which manages information on the individual sensors 10 constituting the sensor network 1 and information collected from the individual sensors, and the like, and provides various services for a user who desires to use the sensor 10. The user can access the services provided by the sensor management apparatus 2 from a user terminal 3 through the wide area network such as the Internet or the like.

Incidentally, all of a large number of the sensors 10 constituting the sensor network 1 are not necessarily owned by an administrator of the sensor management apparatus 2, and various people and organizations such as individuals and business entities other than the administrator can own or operate and manage the sensors (hereinafter a person or an organization which owns or operates and manages the sensor is referred to as an "owner of a sensor"). Consequently, the sensor management apparatus 2 has a function of mediating between the owner of the sensor and the user and executing selection (matching) of the sensor which satisfies a desired condition from the user, granting of a control right of the device to the user, and control of the sensor corresponding to a control request from the user, and the like. In addition, as functions for the owner of the sensor, the sensor management apparatus 2 has a function of registering a new sensor in the system, a function of updating registration information on the sensor, and a function of billing to the user and paying a consideration to the owner, and the like. The detail of these functions will be described later.

As shown in FIG. 1, the sensor management apparatus 2 has functions such as a sensor database 20, a module database 21, a matching process section 22, a control section 23, and a billing management section 24. The sensor management apparatus 2 can be configured by a computer which includes a CPU, a main storage apparatus (memory), an auxiliary storage apparatus (HDD, SSD, or the like), a communication apparatus, an input apparatus, and a display apparatus in terms of hardware. Individual functional blocks shown in FIG. 1 are embodied by loading a computer program stored in the auxiliary memory apparatus into the main storage apparatus and executing the program using the CPU. Note that the sensor management apparatus 2 may be configured by a single computer or can also be configured by a plurality of computers which cooperate with each other.

As the user terminal 3, for example, a personal computer, a cellular phone, a smartphone, and a slate device can be used. Note that an example in which the user performs retrieval and use of the sensor via the Internet is shown, but a configuration may also be adopted in which the sensor management apparatus itself is operated by the user, or a part or all of the functions of the sensor management apparatus is implemented on the side of the user terminal 3. As a terminal 4 of the owner of the sensor, for example, the personal computer, the cellular phone, the smartphone, and the slate device can be used.

Each of the sensors 10 is a device for detecting (acquiring) the state of a sensing target area, and the type of information to be sensed or outputted, a detection method, and a detection means may be any type of information to be sensed or outputted, any detection method, and any detection means. Examples thereof include an image sensor, a temperature sensor, a humidity sensor, an illumination sensor, a force sensor, a sound sensor, an RFID sensor, an infrared sensor, an attitude sensor, a rain sensor, a radioactivity sensor, and a gas sensor. In addition, in the case where one information item can be obtained by combining a plurality of sensors, the plurality of sensors can be handled as one sensor in a virtual manner. In the sensor network, various types of sensors may coexist.

<Sensor Registration>

With reference to FIGS. 1 and 2 (*a*) to 2 (*c*), an example of a sensor registration process performed by the owner of the sensor will be described. FIGS. 2 (*a*) to 2 (*c*) are views schematically showing examples of registration information on the sensor which is registered in the sensor database 20.

The owner of the sensor can access a sensor registration service of the sensor management apparatus 2 via the network by using the terminal 4. The sensor management apparatus 2 presents a screen (not shown) to which information required to register the sensor is inputted, and asks the owner to input the information. The information required to register the sensor includes "owner information" as information on the owner, "sensor information" as information on the sensor, and an "owner condition" when the sensor is used. The information inputted from the owner is registered in the sensor database 20 of the sensor management apparatus 2.

FIG. 2 (*a*) shows an example of an owner information table which stores the registered owner information. The owner information includes an "owner ID" for identifying the owner, an "owned sensor ID" for identifying the sensor owned by the owner, an "owner condition ID" for identifying the condition when the sensor is used (referred to as the owner condition), and an "account number" used in the case where the consideration is paid to the owner. FIG. 2 (*b*) shows an example of an owner condition table which stores the content of the owner condition for each owner condition ID. The owner condition includes the "owner condition ID", a "user level", "controllable time" indicative of a time zone in which the sensor can be used, a "control range" indicative of which setting or function of the sensor can be controlled, a "degree of priority" given to each use condition, and a "consideration" in the case where the sensor is used. FIG. 2(*c*) shows an example of a sensor information table which stores the sensor information for each sensor ID. The sensor information includes the "owned sensor ID", a "sensor type", an "installation position" of the sensor, "specifications" of the sensor, and a "usable module" indicative of a software module which is incorporated in the sensor and can be used. The "specifications" include, e.g., a sensor model, a resolution, a frame rate, an output signal format, a function, a sensing target area (shooting area), and a control protocol.

Herein, the owner ID, the sensor ID, and the owner condition ID, and the like are identifiers allocated by the sensor management apparatus 2. In addition, the user level is information indicative of the type of the user such as an "academic", an "business operator", or a "general user". The information on the user level can be used for various purposes such as limitation on the sensor user (e.g., academic use is permitted but business use is not permitted), charge setting for each user level (e.g., an academic discount or the like), and adjustment in the case where a plurality of use applications are made.

Note that the data structure of each of FIGS. 2(*a*) to 2(*c*) is only an example, and e.g., the name of the owner, a mail address, and a network address of the sensor may also be registered in addition to the information in FIGS. 2(*a*) to 2(*c*). Further, the owner can omit inputting manually the information item that can be automatically obtained from the sensor from among the sensor information items. For example, coordinates of the installation position may be obtained from the sensor in the case of the sensor having a GPS (Global Positioning System). Furthermore, in the case where various information items such as the installation position, the installation direction (angle), and the ability are stored in the internal memory of the sensor, these information items may be read from the sensor.

FIG. 3 schematically shows an example of module information registered in the module database 21 of the sensor management apparatus 2. In the present system, the software module denotes a program for expanding the function of the sensor by being additionally incorporated (installed) in the sensor. Such a software module is sometimes referred to as an add-in, add-on, or plug-in. As shown in FIG. 3, in the module database 21, information items such as a "module ID" for identifying the software module, an "applicable sensor ID" for identifying the sensor in which the module can be incorporated, and a "type" indicative of the expanded function implemented by the module are registered. Herein, as an example of the module incorporated in an image sensor, a facial recognition module which recognizes a face or a person from an image, an object detection module which detects a predetermined object from the image, and a license plate number recognition module which recognizes a license plate number of an automobile through image analysis (character recognition) are shown. These modules are only examples and the module having any function can be used as long as the function can be implemented by software.

<Matching Process Section>

Next, with reference to FIGS. 1, 4, and 5(a) to 5(c), the function of the matching process section 22 of the sensor management apparatus 2 will be described. FIG. 4 is a flowchart showing the flow of the process of the matching process section 22, while FIGS. 5(a) to 5(c) are examples of information inputted from the user of the sensor.

The user of the sensor can access a sensor retrieval service of the sensor management apparatus 2 via the network by using the user terminal 3. The sensor management apparatus 2 presents a screen (not shown) to which information required to use the sensor is inputted, and induces the user to input the information. The information inputted by the user includes "user information" as information on the user, a "use condition" desired by the user, and a "sensor condition" as information for designating the type of the sensor, the use of which is desired (hereinafter the use condition and the sensor condition are collectively referred to as a "desired condition"). In the case where it is not necessary to designate the type of the sensor or the like, (e.g., in the case of the sensor network configured by the sensors of the same type), the input of the sensor condition can be omitted. The information items inputted by the user are received by the sensor management apparatus 2 as one use request.

FIGS. 5(a) to 5(c) show examples of the use request accumulated in a queue of the sensor management apparatus 2. FIG. 5(a) shows an example of a user information table which stores the user information in the order of reception of use requests. In the user information, a "user ID" for identifying the user, a "sensor condition ID" for identifying the sensor condition desired by the user, a "user condition ID" for identifying the use condition desired by the user, and an "account number" for withdrawing a use charge from an account of the user are registered. FIG. 5 (b) shows a use condition table which stores the content of the use condition for each use condition ID. The use condition includes the "use condition ID", a "user level" indicative of the type of the user, "use request time" indicative of a desired use time block of the sensor, a "control request range" indicative of a desired control content, a "payment amount" indicative of the upper limit of the use charge which the user can accept to pay, and a "use method" when the sensor is used. Herein, as the use method, "continuous use" or "temporary use" can be designated. The "continuous use" means continuous (exclusive) use of the sensor solely by the user during the use time, and the "temporary use" means that it is not necessary to exclusively use the sensor during the use time and the user and other users may take turns to use the sensor. In addition, although not shown in the drawing, the use condition table also includes a use time period of the sensor (e.g., the date and time of start of the use and the date and time of end of the use). FIG. 5(c) shows a sensor condition table which stores the content of the sensor condition for each sensor condition ID. The sensor condition includes the "sensor condition ID", a "sensor type", an "installation positon" of the sensor, and "specifications" of the sensor. The "specifications" may include, e.g., the sensor model, the resolution, the frame rate, color/monochrome, the output signal format, the function, the sensing target area (shooting area), and the control protocol.

The received use requests are sequentially processed by the matching process section 22. First, as shown in FIG. 4, the matching process section 22 reads one use request from the queue (Step S40), and also reads the owner information table, the owner condition table, and the sensor information table from the sensor database 20 (Steps S41 to S43). Subsequently, the matching process section 22 compares the desired condition (the use condition and the sensor condition) included in the use request with the owner condition and the sensor information of each sensor registered in the owner condition table and the sensor information table to determine the presence or absence of the sensor which satisfies the desired condition of the user (Step S44). Specifically, the matching process section 22 extracts the sensors which satisfy the sensor condition (the sensor type, the sensor installation position, the specifications, or the like) from among all of the sensors registered in the sensor information table first and, thereafter, selects only the sensor which can be used under the use condition desired by the user from among a plurality of the extracted sensors. In the case where a plurality of the sensors which satisfy the desired condition of the user are detected, the matching process section 22 may narrow the detected sensors down to one based on a predetermined rule (e.g., the sensor of which the use charge is lowest, the sensor having the highest performance, or the like), or may present the list of the plurality of the detected sensors to the user and make the user select the sensor. Note that, in one or more of the above embodiments, the matching of the use condition is executed after the matching of the sensor condition, but the order of the matching process may be altered, and may be appropriately set such that the most efficient (high-speed) matching process can be performed. In addition, in the case where the desired sensor condition is not given from the user (e.g., in the case of the sensor network configured only by the sensors of the same type having the same sensing target area), the matching process of the sensor condition is not necessary.

In the case where the sensor which satisfies the desired condition of the user is extracted in Step S44, the matching process section 22 selects the sensor as a "target sensor", and advances the process to Step S45. On the other hand, in the case where the sensor which satisfies the desired condition of the user is not extracted in Step S44, the matching process section 22 consults the module information of the module database 21 (Step S48), and determines whether or not the sensor which satisfies the desired condition by incorporating the new software module is present (Step S49). In the case where the sensor which satisfies the desired condition by incorporating the software module is present, the matching process section 22 selects the sensor as the "target sensor", and advances the process to Step S45. In the case where such a sensor is not present, the matching process section 22 advances the process to Step S50.

In the case where the target sensor (the sensor which satisfies the desired condition of the user) is selected in Step S44 or S49, the matching process section 22 generates contract information which defines the contract content related to the use of the target sensor (Step S45). The generated contract information is stored in a contract information table in the sensor database 20. FIG. 6(a) shows an example of the contract information table. The contract information includes a "contract ID", an "owner ID" for identifying the owner of the target sensor, a "user ID" for identifying the user of the target sensor, a "target sensor ID" for identifying the target sensor, a "module ID" for identifying the software module required to be incorporated, and a "contract condition ID" for identifying the contact condition related to the use of the target sensor. The contract ID is provided for each use contract of the sensor. The owner ID, the user ID, the target sensor ID, and the module ID are IDs corresponding to the owner ID of the owner information table (FIG. 2 (a)), the user ID of the user information table (FIG. 5 (a)), the owner ID of the sensor information table (FIG. 2 (c)), and the module ID of the module database 21 (FIG. 3). FIG. 6 (b) shows an example of a contract condition table which stores the content of the contract condition for each contract condition ID. The contract condition includes the "contract condition ID", a "user level", "use time" of the sensor, a "control range" indicative of the control content which the user is permitted to perform, a "payment amount" as the consideration for the sensor use, and a "use method". The content of the contract condition is generated from the owner condition of the target sensor (FIG. 2 (b)) and the use condition desired by the user (FIG. 5 (b)).

Thereafter, the matching process section 22 grants the control right of the target sensor to the user (Step S46), and notifies the control section 23 that the user is permitted to control the target sensor (Step S47). As a specific method of the "granting of the control right", any method such as, e.g., a method which transmits the information on the target sensor (the sensor ID and the like) to the terminal 3 of the user, a method which transmits a digital certificate indicative of the control right of the target sensor to the terminal 3 of the user, or a method which transmits a dedicated application for controlling the target sensor to the terminal 3 of the user may be used. On the other hand, in the case where the target sensor is not found (NO in Step S49), the matching process section 22 notifies the user that the sensor which satisfies the use request is not present (Step S50).

Hereinbelow, the description will be complemented by using a specific example. For example, it is assumed that a sensor A including the following owner condition is registered in the sensor database. This example is an example in which the user is permitted to use a monitoring camera capable of PTZ control from 10:00 to 17:00, the control range is limited only to zoom control but the charge is set to be low in the case of academic use of an owner condition 1, and the control range is not limited but the charge is set to be high in the case of business operator use of an owner condition 2.

[Sensor A]
 (sensor information)
 sensor type: camera
 sensor installation position: latitude: 34.9875375 longitude: 135.7594392
 specifications: model number 001 manufactured by x company, VGA, 30 fps, composite output
 usable module: zoom control, pan control, tilt control
 (owner condition 1)
 user level: academic
 controllable time: 10:00 to 17:00
 control range: zoom control only
 consideration: metered rate 50 Yen/minute
 (owner condition 2)
 user level: business operator
 controllable time: 10:00 to 17:00
 control range: All (no limitation)
 consideration: metered rate 200 Yen/minute Herein, it is assumed that the following use condition is given as the use request (it is assumed that the sensor condition is satisfied).

[use condition a]
 user level: business operator
 use request time: 13:00 to 15:00
 control request range: zoom control
 payment amount (upper limit): metered rate 300 Yen/minute

[Use Condition b]
 user level: business operator
 use request time: 13:00 to 15:00
 control request range: facial recognition
 payment amount (upper limit): metered rate 300 Yen/minute

[Use Condition c]
 user level: business operator
 use request time: 13:00 to 18:00
 control request range: none
 payment amount (upper limit): metered rate 100 Yen/minute In the case of the use condition a, the user level of the use condition a matches that of the owner condition 2, the use request time falls within the controllable time, the control request range also falls within the control range, and the payment amount (upper limit) exceeds the consideration, and hence it is determined that the owner condition 2 of the sensor A is satisfied in Step S44, and the sensor A is selected as the target sensor.

In the case of the use condition b, the user level thereof matches that of the owner condition 2, the use request time falls within the controllable time, and the payment mount (upper limit) exceeds the consideration. However, the "facial recognition" as the control request range of the user is not included in the control range "All (zoom control, pan control, tilt control)" of the sensor A. Therefore, NO determination is made in Step S44, and the module database 21 is searched in Step S47. If the "facial recognition" module which can be applied to the sensor A is present, the sensor A is selected as the target sensor and, if such a module is not present, it is determined that there is no sensor which satisfies the use condition b.

In the case of the use condition c, although the user level thereof matches that of the owner condition 2, the use request time is not within the controllable time, and the payment amount (condition) is lower than the consideration. Therefore, it is determined that there is no sensor which satisfies the use condition c.

<Control Section>

Next, with reference to FIGS. 1 and 7, a description will be given of the function of the control section 23 of the sensor management apparatus 2. FIG. 7 is a flowchart showing the flow of the process of the control section 23.

It becomes possible for the user to whom the control right is granted to access the sensor use service of the sensor management apparatus 2 via the network by using the user terminal 3. In the sensor use service, a screen including a window which displays a user interface for controlling the sensor and sensing data (an image or an image analysis result or the like in the case of a camera) is displayed on the user terminal 3. Camera operations such as zoom, pan, and tilt and an operation such as setting change of the resolution and image processing parameters can be performed on the screen. An operation instruction by the user is sent to the control section 23 of the sensor management apparatus 2 as a control request.

As shown in FIG. 7, when the control section 23 receives the control request from the user (Step S60), the control section 23 consults the contract information table (FIG. 6(*a*)) and the contract condition cable (FIG. 6 (*b*)), and determines whether or not the sensor control by the user is permitted (i.e., whether or not the user is a fair user having the control right and the current time is within the usable time) (Step S61). When the control is not permitted (NO in Step S61), the control section 23 suspends the process.

In Step S62, the control section 23 determines whether the sensor already has the function corresponding to the control request or the module needs to be newly incorporated. Specifically, the control section 23 can determine that the incorporation of the module is not necessary in the case where the module ID of the contract information table (FIG. 6 (*a*)) is blank, and can determine that the incorporation of the module is necessary in the case where the module ID is registered. In the case where the incorporation of the module is necessary, the control section 23 acquires the required software module from the module database 21 and downloads the software module to the sensor to thereby expand the function of the sensor (Step S63). Thereafter, the control section 23 generates a control command (instruction) corresponding to the control request (Step S64), and transmits the control command to the sensor (Step S65). Note that, with regard to the specifications of the control command for each sensor (control protocol), the sensor information of the sensor database 20 may be consulted appropriately.

The control section 23 relays the exchange of a signal and data between the user terminal 3 and the sensor, and it is thereby possible to provide the user with a use environment in which the user feels as if the user is directly operating the sensor. With this, in spite of the fact that the monitoring camera is installed by others, it becomes possible to perform operations such as, e.g., changing the orientation or the angle of view of the camera and zooming in on a part in which the user is interested.

<Billing Management Section>

When the sensor use corresponding to the control request is performed using the control section 23, its use history is transmitted to the billing management section 24. The billing management section 24 calculates the use charge based on the use history and the contract condition (FIG. 6(*b*)) between the user and the owner, and executes billing to the user and payment of the consideration to the owner. Note that, in one or more of the above embodiments, the amount set by the owner serves as the use charge, but a method (so-called auction method) may also be adopted in which the amount presented by the user is set as the use charge in the case where the amount presented by the user exceeds the amount set by the owner.

According to one or more of the configurations described above, only by giving the desired condition to the sensor management apparatus 2 by the user who desires to use the sensor, the sensor which satisfies the desired condition is automatically selected. Therefore, inconvenience of finding the desired sensor from among a large number of the sensors is significantly reduced, and convenience is thereby enhanced. In addition, since the control right of the sensor is granted to the user, it becomes possible for the user to control the sensor. At this point, since the control section 23 of the sensor management apparatus 2 performs mediation, the user does not need to think about hardware specifications of the sensor or specifications of the control instruction, or the like. Consequently, the use and control of the sensor by the user are extremely simplified, and it is possible to achieve an improvement in convenience.

In addition, in the matching process section 22, not only the sensor having the function satisfying the desired condition of the user (Step S44) but also the sensor to which the function can be added by incorporating the required software module (Step S48) is selected as the target sensor. With this configuration, it is possible to increase the use opportunity of the sensor, and also improve the convenience for the user. Further, in one or more embodiments of the present invention, since the incorporation of the software module is examined (Step S49) only in the case where the sensor having the function satisfying the desired condition of the user is not present (NO in Step S44), the sensor which requires small labor at the time of use of the sensor (incorporation of the software module or the like) is preferentially selected. Note that, the incorporation of the software module into the sensor is automatically performed by the control section 23 at appropriate timing, and hence the user or the owner of the sensor does not need to take care of operation. With this, a further improvement in convenience is achieved. Note that the software module incorporated in the sensor may be left in the sensor, or may be deleted (uninstalled) from the sensor every time the sensor use of the user is ended or after the use time is expired. The owner or the user may be allowed to select which method is adopted.

Specific examples of application of the above-described sensor network system will be described.

Example 1

It is assumed that the owner of the sensor installs a temperature sensor (may also be a humidity sensor or an illumination sensor or the like) with a setting of "one measurement in two hours". When a user designates "one measurement in one hour" as the use condition and the control right is granted to the user by the matching process section, it is possible to change the set value of the temperature sensor on the user side and increase the measurement period from "once in two hours" to "once in one hour" to thereby implement acquisition of measurement data at a desired sampling period.

By reducing the sampling period of the sensor, the power consumption of the sensor is increased, and a cost for maintenance such as replacement of a battery or the like is increased. Accordingly, it is appropriate to compensate for an increase in maintenance cost resulting from the control of the user by collecting money from the user as the use charge of the sensor.

Example 2

It is assumed that a person installs a movable monitoring camera for monitoring an area for the purpose of crime prevention, and permits other users to temporarily use the monitoring camera because it is not necessary to constantly monitor the area. For example, the person sets the owner condition which permits control for five minutes in one hour or control from 10:00 to 13:00.

A user having the purpose of searching for a lost child requests the system to use the monitoring camera capable of monitoring the area which the user wants to search. The system performs matching between the owner condition registered by the owner of the monitoring camera and the desired condition requested by the user, and grants the control right of the monitoring camera to the user based on the result of the matching.

The user can search for the lost child by controlling, e.g., the orientation and the zoom of the monitoring camera via the Internet.

In addition, in order to increase the efficiency of search for the child, it is possible to add the function of facial detection/recognition to the monitoring camera. That is, the software module for facial detection/recognition which operates in the monitoring camera is downloaded to the monitoring camera, and the facial image of the child is transmitted to the monitoring camera via the control section 23. With this, it becomes possible to adopt a use method which automatically searches for the lost child using the monitoring camera and acquires the result of the search periodically.

Example 3

It is assumed that the use requests having different purposes of a plurality of users are concentrated on one sensor such as the case where a user 1 wants to know a traffic volume of vehicles in an area, a user 2 wants to know the number of passers in the same area, and a user 3 wants to know the license plate numbers of vehicles traveling in the same area.

The matching process section 22 performs a mediation process which determines which user is permitted to use the sensor in the case where there are a plurality of users (use applicants) of the same sensor. At this point, in the case where the competition of the use time does not occur, the control right may be granted to all of the use applicants. In the case where the competition of the use time occurs, it is determined which user is preferentially permitted to use the sensor based on the owner condition registered by the owner and the use condition inputted by each user. In Example 3, it is assumed that the use times of the users 1 to 3 do not compete with one another, and the control right is granted to all of them.

In order to achieve the use purpose of the user 1, it is necessary to have a function of detecting vehicles from an image and calculating the number of vehicles, and it is assumed that the sensor (the monitoring camera) already has the function. In order to achieve the use purpose of the user 2, it is necessary to have a function of detecting persons from the image and calculating the number of persons. In addition, in order to achieve the use purpose of the user 3, it is necessary to have a function of obtaining the image of a license plate of the vehicle and automatically recognizing the license plate number. These functions are not provided in the sensor so that the control section 23 performs the incorporation of the required software module at the sage of (or before the sage of) reception of the first control requests from the users 2 and 3.

With this, the user 1 can acquire the traffic volume of vehicles as the detection result of the sensor. The user 2 can acquire the amount of traffic of passers as the detection result of the sensor. In addition, the user 3 can change the setting of the zoom or the resolution on an as needed basis to thereby acquire the clear image of the license plate or obtain data on the license plate number as the detection result. In the case where a plurality, of users are present, the system asks each user to pay the proper use charge according to the time when the user controls/uses the sensor and the control target, and the like.

Example 4

A description will be given of an example of the mediation process in the case where there are a plurality of users of the same sensor. This kind of the mediation is required, e.g., in the case where the use requests having the use times which overlap each other are received from the user 1 and the user 2 at almost the same timing. Although there are cases where, after the control right is granted to the user 1, the use request which competes with this right is received from another user 2, the right of the user 1 is maintained in such cases in principle.

The owner of the sensor can set the degree of priority to each user level (user type). In the example of FIG. 2(b), the degree of priority "high", the degree of priority "middle", and the degree of priority "low" are set to academic use, business operator use, and general user use, respectively. In the case where there are a plurality of users, the matching process section 22 grants the control right to the user having the highest degree of priority. That is, in the example of FIG. 2(b), in the case where the user with the academic use and the user with the general user use compete with each other, the user with the academic use is prioritized. The owner can set the degree of priority freely, and hence, e.g., the degree of priority of the academic use may be appropriately made higher with emphasis placed on publicness of the sensor, and the degree of priory of the business operator use or the general user use may also be appropriately made higher with emphasis placed on feasibility of the sensor.

In the case where there are users having the same degree of priority, the matching process section 22 compares the use conditions presented by the users with each other, and may appropriately select the user presenting the condition advantageous to the owner of the sensor. For example, in the case of the method (auction method) in which the use charge of the sensor is determined based on the amount presented by the user, it is possible to grant the control right to the user presenting the higher amount. Alternatively, a combination of users to which the control right is granted may be appropriately determined such that as many users as possible are permitted to use the sensor and the total use charge paid to the owner of the sensor is thereby increased.

Further, it is also possible to use the use method (designation of the "continuous use" or the "temporary use") requested by the user in the mediation process. For example, in the case where there is a user who desires the "continuous use", the control right may be preferentially granted to the user, and the granting of the competing control right (over which use time overlaps) of the same sensor to other users may be appropriately prohibited. With this, since the user who desires the "continuous use" can exclusively use the sensor for specific time, elimination of disturbance or delay and real-time processing and the like can be expected. This is preferable e.g., in the case where an important process is performed or the case where a large number of processes are executed continuously. Note that, it is not possible to permit other users to use the sensor during the time period when the continuous use is permitted, and hence the use charge may be appropriately set to be higher in the case of the continuous use than in the case of the temporary use.

On the other hand, in the case where there are a plurality of users who desire the "temporary use", the control right of the sensor may be granted to all of the users, and the users may be appropriately permitted to use the sensor in a time-sharing manner. Allocation time of the control right (length of time when the sensor can be used) may be appropriately determined according to, e.g., the degree of priority corresponding to the user level and the amount presented by the user described above. In the case where the sensor is shared by a plurality of the users, the allocation time and the use charge may be presented to each user and the consent of the user may be appropriately obtained before the control right is granted to the user. This is because the user may cancel the use application e.g., in the case where the allocation time is short. The system of the "temporary use" gives the owner of the sensor an advantage that an improvement in the use efficiency of the sensor can be achieved, and gives the user an advantage that loss of the use opportunity due to competition with others is reduced and convenience is improved.

Note that the above-described embodiments are merely examples, and the scope of the present invention is not intended to be limited to the examples. For example, although an example in which one or more embodiments of the present invention is applied to the sensor network system is described above, it is also possible to apply one or more embodiments of the present invention to the device network systems including the devices other than the sensor (e.g., an actuator, controller, robot, light fixture, digital signage, and display).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

1: sensor network
2: sensor management apparatus
3: user terminal
4: terminal of sensor owner
10: sensor
20: sensor database
21: module database
22: matching process section
23: control section
24: billing management section

The invention claimed is:

1. A device management apparatus, in a sensor network system, that mediates between an owner of a device and a user who is not the owner of the device in order to permit the user to use the device through a wide area network, wherein the device is selected from a plurality of monitoring sensor devices, comprising:
  a device information storage in which information of each of the plurality of monitoring sensor devices is registered comprising an owner condition for giving access to the device, wherein the owner condition includes a controllable time and a control range indicative of which function of the device is used;
  an acquisition section which acquires a desired condition, for getting access to the device, from the user; and
  a matching process section which performs matching between the desired condition acquired from the user and the owner condition comprised in the information of each device registered in the device information storage thereby configured to:
  select a device satisfying the desired condition as a target device;
  generate contract information about a contract indicating a payment amount that the user accepts to pay related to the use of the target device between an owner of the target device and the user; and
  grant a control right of the target device to the user for the controllable time indicated in the owner condition.

2. The device management apparatus according to claim 1 further comprising a controller which acquires a control request of the target device from the user, to whom the control right is granted, and transmits a control instruction corresponding to the control request to the target device.

3. The device management apparatus according to claim 2,
  wherein, in a case where the target device is a device not having a function satisfying the desired condition but to which a software module having the function can be added, the controller downloads a required software module to the target device when the controller transmits the control instruction to the target device.

4. The device management apparatus according to claim 2,
  wherein the matching process section has mediation section that determines which user is permitted to use a device in a case where there are a plurality of the users of the same device.

5. The device management apparatus according to claim 4,
  wherein the mediation section determines the user, to whom the control right is granted, based on a degree of priority pre-set for each user type, or a use charge presented by the user, or both of the degree of priority and the use charge.

6. The device management apparatus according to claim 4,
  wherein the mediation section grants the control right of the same target device to a plurality of the users, and
  wherein the controller permits the plurality of the users to use the target device in a time-sharing manner.

7. The device management apparatus according to claim 4,
  wherein the user can request continuous use of a device in desired use time, and
  wherein, in a case where the control right is granted to the user having requested the continuous use, the mediation section prohibits granting of the control right of the same device, over which use time overlaps, to the other users.

8. The device management apparatus according to claim 1,
  wherein the plurality of devices include a device capable of function extension by addition of a software module, and
  wherein the matching process section selects a device having a function satisfying the desired condition or a device not having the function satisfying the desired condition but to which the software module having the function can be added, as the target device.

9. The device management apparatus according to claim 1, wherein, in a case where a device which has a function satisfying the desired condition is not present among the plurality of devices, the matching process section selects a device not having the function satisfying the desired condition but to which a software module having the function can be added, as the target device.

10. A device management method, in a sensor network system, that mediates between an owner of a device and a user who is not the owner of the device in order to permit the user to use the device through a wide area network, wherein the device is selected from a plurality of monitoring sensor devices, for a computer having a device information storage in which information on each of a plurality of devices is registered comprising an owner condition for giving access to the device, wherein the owner condition includes a controllable time and a control range indicative of which function of the device is used, the method comprising:

acquiring a desired condition, for getting access to the device, from the user; and performing matching between the desired condition acquired from the user and the owner condition comprised in the information of each device registered in the device information storage thereby:

selecting a device satisfying the desired condition as a target device;

generating contract information about a contract indicating a payment amount that the user accepts to pay related to the use of the target device between an owner of the target device and the user; and granting a control right of the target device to the user for the controllable time indicated in the owner condition.

11. A non-transitory computer readable medium storing a program causing a computer to execute each step of the device management method according to claim 10.

12. A sensor network system to permit a user who is not an owner of a monitoring camera to use the monitoring camera through a wide area network, wherein the monitoring camera is selected from a plurality of monitoring sensor devices, comprising:

a matching process section that acquires a user condition, for getting access to the monitoring camera, including condition of amount and use time block desired by the user from a user terminal, and performs matching between the user condition and an owner condition including condition of amount and use time block related to use of the monitoring camera and a control range indicative of which function of the monitoring camera is used;

a controller that enables control of operation of the monitoring camera from the user terminal and which provides an image taken with the monitoring camera to the user terminal, in a case where the user condition matches the owner condition; and a billing manager that generates contract information about a contract indicating a payment amount that the user accepts to pay related to the use of the monitoring camera between the owner of the monitoring camera and the user, and granting a control right of the monitoring camera to the user for the use time indicated in the owner condition.

* * * * *